United States Patent Office 3,308,151
Patented Mar. 7, 1967

3,308,151
PROCESS FOR THE OXIDATION OF OLEFIN-AMMONIA MIXTURES TO UNSATURATED NITRILES
James L. Callahan, Cuyahoga County, Ohio, and Berthold Gertisser, Essex County, N.J., assignors to The Standard Oil Company, Cleveland, Ohio, a corporation of Ohio
No Drawing. Filed Jan. 11, 1965, Ser. No. 462,460
6 Claims. (Cl. 260—465.3)

This invention relates to the oxidation of olefin-ammonia mixtures to unsaturated nitriles, such as propylene-ammonia to acrylonitrile and isobutylene-ammonia to methacrylonitrile using oxidation catalyst systems consisting essentially of oxides of antimony and uranium.

This application is a continuation-in-part of application Serial No. 201,329, filed June 11, 1962, now abandoned, and of application Serial No. 247,331, filed December 26, 1962, now U.S. Patent No. 3,198,750, patented August 3, 1965.

U.S. Patent No. 2,904,580, dated September 15, 1959, describes a catalyst composed of antimony oxide and molybdenum oxide, as antimony molybdate, and indicates its utility in converting propylene to acrylonitrile.

British Patent 864,666, published April 6, 1961, describes a catalyst composed of an antimony oxide alone or in combination with a molybdenum oxide, a tungsten oxide, a tellurium oxide, a copper oxide, a titanium oxide, or a cobalt oxide. These catalysts are said to be either mixtures of these oxides or oxygen-containing compounds of antimony with the other metal; such as antimony molybdate or molybdoantimonate. These catalyst systems are said to be useful in the production of unsaturated aldehydes such as acrolein or methacrolein from olefins such as propylene or isobutene and oxygen.

British Patent 876,446, published August 30, 1961, describes catalysts including antimony, oxygen and tin, and said to be either mixtures of antimony oxides with tin oxides or oxygen-containing compounds of antimony and tin such as tin antimonate. These catalysts are said to be useful in the production of unsaturated aliphatic nitriles such as acrylonitrile from olefins such as propylene, oxygen and ammonia.

I

*The catalyst*

In accordance with the invention, an oxidation catalyst is provided consisting essentially of oxides of antimony and uranium. This catalyst is useful not only in the oxidation of olefins to oxygenated hydrocarbons such as unsaturated aldehydes and acids, for example, acrolein and methacrolein, and acrylic and methacrylic acid, and the oxidation of olefin-ammonia mixtures to unsaturated nitriles such as acrylonitrile, and methacrylonitrile, but also in the catalytic oxidative dehydrogenation of olefins to diolefins.

The nature of the chemical compounds which compose the catalyst of the invention is not known. The catalyst may be a mixture of antimony oxide or oxides and uranium oxide or oxides. It is also possible that the antimony and uranium are combined with the oxygen to form an antimonate or uranate. X-ray examination of the catalyst system has indicated the presence of a structurally common phase of the antimony type, composed of antimony oxide, and some form of uranium oxide. Antimony tetroxide has been identified as present. For the purposes of description of the invention, this catalyst system will be referred to as a mixture of antimony and uranium oxides, but this is not to be construed as meaning that the catalyst is composed either in whole or in part of these compounds.

The proportions of antimony and uranium in the catalyst system may vary widely. The Sb:U atomic ratio can range from about 1:50 to about 99:1. However, optimum activity appears to be obtained at Sb:U atomic ratios within the range from 1:1 to 25:1.

The catalyst can be employed without support, and will display excellent activity. It also can be combined with an inert support, and preferably at least 10% up to about 90% of the supporting compound by weight of the entire composition is employed in this event. Any known support materials can be used, stable under the reaction conditions to be encountered in the use of the catalyst.

The antimony oxide and uranium oxide can be blended together, or can be formed separately and then blended, or formed separately or together in situ. As starting materials for the antimony oxide component, for example, there can be used any antimony oxide, such as antimony trioxide, antimony tetroxide and antimony pentoxide, or mixtures thereof; or a hydrous antimony oxide, metaantimonic acid, orthoantimonic acid or pyroantimonic acid; or a hydrolyzable or decomposable antimony salt, such as an antimony halide, for example, antimony trichloride, trifluoride or tribromide; antimony pentachloride and antimony pentafluoride, which is hydrolyzable in water to form the hydrous oxide. Antimony metal can be employed, the hydrous oxide being formed by oxidizing the metal with an oxidizing acid such as nitric acid.

The uranium oxide component can be provided in the form of uranium oxide or by precipitation in situ from a soluble uranium salt such as the nitrate, acetate, or a halide such as the chloride. Uranium metal can be used as a starting material, and if antimony metal is also employed, the antimony can be converted to the oxide and uranium to the nitrate simultaneously by oxidation in hot nitric acid. A slurry of hydrous antimony oxide formed in situ from the metal in nitric acid also can be combined with a solution of a uranium salt such as uranium nitrate, which is then precipitated in situ as uranium oxide by the addition of ammonium hydroxide. The ammonium nitrate and any other soluble salts are removed by filtration of the resutling slurry.

It will be apparent from the above that uranium tribromide, uranium tetrabromide, uranium trichloride, uranium tetrachloride, uranium pentachloride, uranium hexafluoride, uranium tetraiodide, uranyl nitrate, uranyl sulfate, uranyl chloride, uranyl bromide, uranium trioxide, and uranium peroxide can be employed as the source of the uranium oxide component.

The catalytic activity of the system is enhanced by heating at an elevated temperature. Preferably, the catalyst mixture is dried and heated at a temperature of from about 500 to about 1150° F., preferably at about 700 to 900° F., for from two to twenty-four hours. If activity then is not sufficient, the catalyst can be further heated at a temperature above about the 1000° F. but below a temperature deleterious to the catalyst at which it is melted or decomposed, preferably from about 1400° F. to about 1900° F. for from one to forty-eight hours, in the presence of air or oxygen. Usually this limit is not reached before 2000° F., and in some cases this temperature can be exceeded.

In general, the higher the activation temperature, the less time required to effect activation. The sufficiency of activation at any given set of conditions is ascertained by a spot test of a sample of the material for catalytic activity. Activation is best carried out in an open chamber, permitting circulation of air or oxygen, so that any oxygen consumed can be replaced.

The antimony oxide-uranium oxide catalyst composition of the invention can be defined by the following empirical formula:

$$Sb_a U_b O_c$$

where $a$ is 1 to 99, $b$ is 50 to 1, and $c$ is a number taken to satisfy the average valences of antimony and uranium in the oxidation states in which they exist in the catalyst as defined by the empirical formula above. Thus, the Sb valence may range from 3 to 5 and the U valence from 4 to 6.

This catalyst system is useful in the oxidation of olefins to oxygenated compounds, such as aldehydes and acids, in the presence of oxygen, and in the oxidation of olefins to unsaturated nitriles in the presence of oxygen and ammonia. Nitriles and oxygenated compounds such as aldehydes and acids can be produced simultaneously using process conditions within the overlapping ranges for these reactions, as set forth in detail below. The relative proportions of each that are obtainable will depend on the catalyst and on the olefin. The same catalyst may produce predominantly the nitrile with propylene and predominantly the aldehyde and/or acid with isobutylene. The term "oxidation" as used in this specification and claims encompasses the oxidation to aldehydes and acids and to nitriles, all of which conversions require oxygen as a reactant.

II

*Oxidation of olefins to nitriles*

The reactants used are oxygen and propylene or isobutylene or mixtures thereof, plus ammonia.

In its preferred aspect, the process comprises contacting a mixture comprising propylene or isobutylene, ammonia and oxygen with the catalyst at an elevated temperature and at atmospheric or near atmospheric pressure.

Any source of oxygen may be employed in this process. For economic reasons, however, it is preferred that air be employed as the source of oxygen. From a purely technical viewpoint, relatively pure molecular oxygen will give equivalent results. The molar ratio of oxygen to the olefin in the feed to the reaction vessel should be in the range of 0.5:1 to 4:1 and a ratio of about 1:1 to 3:1 is preferred.

Low molecular weight saturated hydrocarbons do not appear to influence the reaction to an appreciable degree, and these materials can be present. Consequently, the addition of saturated hydrocarbons to the feed to the reaction is contemplated within the scope of this invention. Likewise, diluents such as nitrogen and the oxides of carbon may be present in the reaction mixture without deleterious effect.

The molar ratio of ammonia to olefin in the feed to the reaction may vary between about 0.05:1 to 5:1. There is no real upper limit for the ammonia-olefin ratio, but there is generally no reason to exceed the 5:1 ratio. At ammonia-olefin ratios appreciably less than the stoichiometric ratio of 1:1, various amounts of oxygenated derivatives of the olefin will be formed.

Significant amounts of unsaturated aldehydes and even unsaturated acids as well as nitriles will be obtained at ammonia-olefin ratios substantially below 1:1, i.e., in the range of 0.15:1 to 0.75:1, particularly in the case of higher olefins such as isobutylene. Outside the upper limit of this range only insignificant amounts of aldehydes and acids will be produced, and only very small amounts of nitriles will be produced at ammonia-olefin ratios below the lower limit of this range. It is fortuitous that within the ammonia-olefin range stated, maximum utilization of ammonia is obtained, and this is highly desirable. It is generally possible to recycle any unreacted olefin and unconverted ammonia.

A particularly surprising aspect of this invention is the effect of water on the course of the reaction. We have found that in many cases water in the mixture fed to the reaction vessel improves the selectivity of the reaction and yield of nitrile. However, reactions not including water in the feed are not to be excluded from this invention, inasmuch as water is formed in the course of the reaction.

In general, the molar ratio of added water to olefin, when water is added, is at least about 0.25:1. Ratios on the order of 1:1 to 3:1 are particularly desirable, but higher ratios may be employed, i.e., up to about 10:1.

The reaction is carried out at a temperature within the range of from about 550 to about 1100° F. The preferred temperature range is from about 800 to 1000° F.

The pressure at which reaction is conducted is also an important variable, and the reaction should be carried out at about atmospheric or slightly above atmospheric (2 to 3 atmospheres) pressure. In general, high pressures, i.e., about 250 p.s.i.g., are not suitable, since higher pressures tend to favor the formation of undesirable by-products.

The apparent contact time is not critical, and contact times in the range of from 0.1 to about 50 seconds may be employed. The optimum contact time will, of course, vary, depending upon the olefin being treated, but in general, a contact time of from 1 to 15 seconds is preferred.

In general, any apparatus of the type suitable for carrying out oxidation reactions in the vapor phase may be employed in the execution of this process. The process may be conducted either continuously or intermittently. The catalyst bed may be a fixed bed employing a large particulate or pelleted catalyst or, in the alternative, a so-called "fluidized" bed of catalyst may be employed.

The reactor may be brought to the reaction temperature before or after the introduction of the reaction feed mixture. However, in a large scale operation, it is preferred to carry out the process in a continuous manner, and in such a system the recirculation of the unreacted olefin is contemplated. Periodic regeneration or reactivation of the catalyst is also contemplated, and this may be accomplished, for example, by contacting the catalyst with air at an elevated temperature.

The products of the reaction may be recovered by any of the methods known to those skilled in the art. One such method involves scrubbing the effluent gases from the reactor with cold water or an appropriate solvent to remove the products of the reaction. If desired, acidified water can be used to absorb the products of reaction and neutralize unconverted ammonia. The ultimate recovery of the products may be accomplished by conventional means. The efficiency of the scrubbing operation may be improved when water is employed as the scrubbing agent by adding a suitable wetting agent to the water. Where molecular oxygen is employed as the oxidizing agent in this process, the resulting product mixture remaining after the removal of the nitriles may be treated to remove carbon dioxide with the remainder of the mixture containing the unreacted olefin and oxygen being recycled through the reactor. In the case where air is employed as the oxidizing agent in lieu of molecular oxygen, the residual product after separation of the nitriles and other carbonyl products may be scrubbed with a non-polar solvent, e.g., a hydrocarbon fraction, in order to recover unreacted olefin, and in this case the remaining gases may be discarded. The addition of a suitable inhibitor to prevent polymerization of the unsaturated products during the recovery steps is also contemplated.

The following examples, in the opinion of the inventors, represent preferred embodiments of the catalyst system of the invention, and of the processes of oxidation of olefins therewith.

*Examples 1 and 2*

A catalyst system composed of antimony oxide and uranium oxide, having an Sb:U atomic ratio of 8:1 was prepared as follows. 90 g. of antimony was dissolved in 375 cc. of nitric acid (specific gravity 1.42) and the mixture was heated until the evolution of oxides of nitrogen had ceased. To this solution was then added a solution of 40.1 g. of uranyl acetate $UO_2(C_2H_3O_2)_2 2H_2O$ in 400 cc. of water. 300 cc. of ammonium hydroxide solution was then added, and the filtered reaction slurry washed with 600 cc. of water in three 200 cc. portions. The filter cake was dried at 120° C. overnight, calcined at 800° F. for 12 hours, and activated by heating at 1400° F. for 12 hours in a muffle furnace open to the atmosphere.

This catalyst system was then tested for catalytic activity in the oxidation of propylene to acrylonitrile and to acrolein. A bench scale oxidation unit of approximately 100 ml. catalyst capacity was employed. The gas feed was metered by Rotameters and water was fed by means of a Sigma-motor pump through capillary copper tubing.

In the conversion to acrylonitrile, the feed molar ratio propylene/$NH_3$/air/nitrogen/water was 1/1.5/12/4/1. The apparent contact time was 5 seconds. The reaction temperature was 870–880° F. The total conversion was 79%, per pass, of which 48.6% of the propylene feed was converted to acrylonitrile and 5.3% to acetonitrile.

*Examples 3 and 4*

An antimony oxide-uranium oxide catalyst having an Sb:U ratio of 7:1 was prepared as follows. 45 g. of antimony metal, 150 mesh, was dissolved in 186 cc. of nitric acid (specific gravity 1.42) by boiling until the evolution of oxides of nitrogen had ceased. To this was added 26.7 g. of uranyl nitrate dissolved in 200 cc. of water. 150 cc. of 28% ammonium hydroxide solution was added to the mixture. The reaction slurry was then filtered, and washed with three 100 cc. portions of wash water containing a small amount of ammonia. The catalyst was dried at 120° C. overnight, calcined at 800° F. overnight and activated by heating at 1400° F. for 12 hours in a muffle furnace open to the atmosphere.

This catalyst system was employed in the conversion of propylene to acrylonitrile using the reactor of Examples 1 and 2. Table I sets forth the reaction conditions, and the composition of the effluent. In addition to the components shown, the effluent contained minor amounts of carbon dioxide and hydrogen cyanide. The total coversions of propylene were approximately quantitative, and good conversions to acrylonitrile were obtained.

TABLE I

| Example No. | Feed Ratio C-3/NH3/Air/N2/H2O Molar or vol. ratio | Temperature, °F. | Percent Conversion Per Pass | |
|---|---|---|---|---|
| | | | Acrylonitrile | Acetonitrile |
| 3 | 1/1.5/12/7/1 | 880–890 | 76.5 | 4.3 |
| 4 | 1/1.5/12/7/1 | 870–880 | 73.1 | 6.3 |

*Examples 5 and 6*

A silica-supported catalyst was prepared by mixing 60.6 g. of the activated catalyst prepared in accordance with Examples 3 and 4, with 198 g. of an aqueous silica sol containing 30.6% $SiO_2$. The resulting catalyst was dried in the oven at 120° C. with occasional stirring for three hours, and calcined at 800° F. overnight.

The catalyst system was employed in the conversion of propylene to acrylonitrile, under the conditions and with the results shown in Table II. In addition to the ingredients shown, the effluent included minor amounts of carbon dioxide and hydrogen cyanide, and traces of acetonitrile.

TABLE II

| Example No. | Feed Ratio C-3/NH3/Air/N2/H2O Molar or vol. ratio | Temperature, °F. | Apparent Contact Time | Percent Conversion Per Pass | |
|---|---|---|---|---|---|
| | | | | Total | Acrylonitrile |
| 7 | 1/1.5/10/7/1 | 875–900 | 3 | 63.9 | 50.5 |
| 8 | 1/1.5/10/7/1 | 880–890 | 5 | 49.7 | 37.5 |

*Example 7*

A silicon-carbide-supported catalyst was prepared by mixing 60 g. of the activated catalyst of Examples 3 and 4 with 60 g. of silicon carbide, both through 80 mesh. The mixture was stirred with 400 cc. of water, and the homogeneous aqueous mixture then dried in the oven with occasional stirring at 130° C. overnight, and calcined at 800° F. for 18 hours.

This catalyst was employed in the conversion of propylene to acrylonitrile, using a micro reactor composed of a feed induction system, a molten salt bath furnace, reactor sampling valve and vapor phase chromatograph. The reactor was placed in the salt bath furnace and connected with the feed induction system and sampling device. The reaction was carried out at a temperature in the range of 800–840° F., and the apparent contact time was 3 seconds, using 6 g. of catalyst. The feed molar ratio propylene/air was 0.1. 55% of the propylene feed was converted to acrylontrile under these conditions.

*Example 8*

An antimony oxide-uranium oxide catalyst having an Sb:U ratio of 6:1 was prepared as follows. 90 g. of antimony metal (less than 80 mesh) was heated in 372 cc. of concentrated nitric acid until the evolution of oxides of nitrogen had ceased. To this was added 53.4 g. of uranyl acetate partially dissolved in water. Water was added to dilute the mixture, and then 300 ml. of 28% ammonium hydroxide was added. The slurry was filtered, and the filter cake washed with three 300 cc. portions of 0.1% ammonium hydroxide solution. After the last wash, air was drawn through the filter cake for 10 minutes. The catalyst was dried at 130° C., calcined at 800° F., and then activated by heating at 1400° F. in a muffle furnace open to the atmosphere.

This catalyst was used in the conversion of propylene to acrylonitrile, using the micro reactor of Example 7. The catalyst charge was 5.4 g. Otherwise, the conditions were the same as Example 7. 71.8% of the propylene feed was converted to acrylonitrile and 8.3% to acetonitrile.

*Example 9*

A catalyst system composed of antimony oxide and uranium oxide having an Sb:U ratio of 6:1 supported on one-third of its weight of silica was prepared as follows. 90 g. of 80 mesh antimony was dissolved in 360 cc. of hot concentrated nitric acid (specific gravity 1.42) and the mixture was heated until the evolution of oxides of nitrogen had ceased, and the mixture evaporated almost to dryness. To this was then added 53.4 g. of uranyl acetate $UO_2 (C_2H_3O_2)_2 2H_2O$ with stirring. The mixture was ball milled for 4 hours. In removing the mass from the mill, 200 cc. of water was added, and then 194 g. of aqueous silica sol (30.6% $SiO_2$). With constant stirring, 200 cc. of 28% ammonium hydroxide solution was then added, the slurry filtered and the precipitate washed with 300 cc. of water in three 100 cc. portions. The filter cake was dried at 120 to 130° overnight, calcined at 800° F. for 20 hours, and activated by heating at 1800° F. for 8 hours in a muffle furnace open to the atmosphere.

This catalyst system was then tested for catalytic activity in the oxidation of propylene to acrylonitrile. A bench scale oxidation unit of approximately 100 ml. catalyst capacity was employed. The gas feed was metered by Rotameters and water was fed by means of a Sigma-motor pump through capillary copper tubing.

In the conversion to acrylonitrile, the feed molar ratio propylene/$NH_3$/air/nitrogen water was 1/1.5/12/4/4. The apparent contact time was 3 seconds. The reaction temperature was 900° F. The total conversion was 91% per pass, 75% of propylene feed being converted to acrylonitrile, and 1.0% to acetonitrile.

*Example 10*

A catalyst system composed of antimony oxide and uranium oxide having a Sb:U ratio of 4.9:1 supported on one-half its weight of silica was prepared as follows. 75 g. of 80 mesh antimony was dissolved in 275 cc. of hot concentrated nitric acid (specific gravity 1.42) and the mixture was heated until the evolution of oxides of nitrogen had ceased, and the mixture evaporated almost to dryness. To this was then added 53.4 g. of uranyl acetate $UO_2(C_2H_3O_2)_2 \cdot 2H_2O$ with stirring. The mixture was ball milled for 4 hours. In removing the mass from the mill, 200 cc. of water was added, and then 226 g. of aqueous silica sol (30.6% $SiO_2$). With constant stirring, 150 cc. of 28% ammonium hydroxide solution was then added, the slurry filtered, and the precipitate washed with 300 cc. of water in three 100 cc. portions. The filter cake was dried at 120 to 130° C. overnight, calcined at 800° F. for 20 hours, and activated by heating at 1800° F. for 8 hours in a muffle furnace open to the atmosphere.

This catalyst system was then used for the oxidation of isobutylene to methacrylonitrile. A fixed bed oxidation unit was employed, in the form of a 5 foot tube of ½ inch diameter No. 40 pipe. This bed was charged with 333 g. of the catalyst. The gas feed (ammonia, isobutylene and air) was metered by Rotameters, and water was fed by means of a Sigma-motor pump through capillary copper tubing. The process conditions are given in Table III.

TABLE III

| Example No. | Feed Ratio, iso-$C_4$/$NH_3$/Air/$H_2O$ Molar or vol. ratio | Temperature and pressure | Apparent Contact Time, sec. | Percent Conversion per Pass | | |
|---|---|---|---|---|---|---|
| | | | | Total | Methacrylonitrile | Methacrolein |
| 10 | 1/1/12/4 | 800° F., 4 p.s.i.g. | 4 | 71.9 | 60.0 | 3.5 |

It is apparent from Table III that the same catalyst can convert isobutylene predominantly to methacrylonitrile. Excellent per-pass conversions are obtainable.

We claim:
1. A process for the oxidation of propylene and isobutylene to form acrylonitrile and methacrylonitrile, respectively, which comprises the step of contacting in the vapor phase at a temperature within the range from about 550 to about 1100° F. a mixture of ammonia, oxygen and an olefin selected from the group consisting of propylene, isobutylene, and mixtures thereof in a molar ratio of olefin to ammonia of from about 1:0.05 to about 1:5, and a molar ratio of oxygen to olefin within the range from about 0.5:1 to about 4:1, in the presence of a catalyst composition consisting essentially of an active catalytic oxide complex of antimony and uranium as an essential catalytic ingredient, the Sb:U atomic ratio being within the range from about 1:50 to about 99:1, said complex being formed by heating the mixed oxides of antimony and uranium in the presence of oxygen at an elevated temperature of above 500° F. but below their melting point for a time sufficient to form said active catalytic oxide complex of antimony and uranium.

2. The process of claim 1, in which the Sb:U atomic ratio in the catalyst is within the range from 1:1 to 25:1.

3. The process of claim 1, in which the catalyst composition is carried on an inert support.

4. The process of claim 1, in which the molar ratio of oxygen to olefin is from about 1:1 to about 3:1.

5. The process of claim 1, which comprises feeding water in the olefin-ammonia-oxygen mixture in a ratio of water to olefin within the range from about 0.25:1 to about 10:1.

6. The process of claim 1, in which the reaction is carried out at a pressure above atmospheric pressure up to about 250 p.s.i.g.

References Cited by the Examiner
UNITED STATES PATENTS

| | | | |
|---|---|---|---|
| 2,621,204 | 12/1952 | Maclean et al. | 260—465.3 |
| 2,776,316 | 1/1957 | Baldwin | 260—604 |
| 2,941,007 | 6/1960 | Callahan | 260—604 |
| 3,009,943 | 11/1961 | Hadley et al. | 260—465.3 |

OTHER REFERENCES

The Merck Index, 7th ed., 1960, page 17, RS–356–M524, 1960.

CHARLES B. PARKER, *Primary Examiner.*

JOSEPH P. BRUST, *Examiner.*